United States Patent
Sharma et al.

(10) Patent No.: US 7,609,678 B2
(45) Date of Patent: Oct. 27, 2009

(54) PROVIDING INFORMATION ON WIRELESS SERVICE COVERAGE ALONG ROUTES BEING CONSIDERED FOR A JOURNEY

(75) Inventors: Ranjan Sharma, New Albany, OH (US); Shengqiang Wang, Raleigh, NC (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 401 days.

(21) Appl. No.: 11/374,365

(22) Filed: Mar. 13, 2006

(65) Prior Publication Data

US 2007/0211676 A1   Sep. 13, 2007

(51) Int. Cl.
*G06F 15/16* (2006.01)
(52) U.S. Cl. .................... 370/338; 340/995.1
(58) Field of Classification Search .............. 455/404.1, 455/456.1–456.3, 457; 340/989, 995.1; 370/338
See application file for complete search history.

(56) References Cited

U.S. PATENT DOCUMENTS

| | | | |
|---|---|---|---|
| 2002/0113817 A1* | 8/2002 | Mitsugi | 345/744 |
| 2007/0078848 A1* | 4/2007 | Sareen et al. | 707/5 |
| 2007/0096945 A1* | 5/2007 | Rasmussen et al. | 340/995.1 |

* cited by examiner

*Primary Examiner*—Sam Bhattacharya
(74) *Attorney, Agent, or Firm*—Carmen Patti Law Group, LLC (57) ABSTRACT

An illustrative method provides information to a user on wireless communication coverage along at least one route. A wireless availability server receives a user request for coverage information where the request includes an origination and destination location provided by the user for at least one route. A set of routes connecting the origination and destination locations is determined. A query is made to a database containing wireless coverage data based on the origination and destination locations, and the set of routes. A response to the query contains wireless coverage information along the set of routes. A reply is transmitted to the user responding to the user request where the reply contains the wireless coverage information.

20 Claims, 4 Drawing Sheets

PROVIDING INFORMATION ON WIRELESS SERVICE COVERAGE ALONG ROUTES BEING CONSIDERED FOR A JOURNEY

CROSS REFERENCE TO RELATED APPLICATION

This application is related to U.S. Ser. No. 11/374,366 filed concurrently herewith, and entitled "Location Specific Information on Wireless Service Coverage".

BACKGROUND

This invention relates to wireless communications and more specifically to providing information concerning wireless coverage areas along potential routes being considered for a journey.

Wireless communication devices, e.g. cellular handsets, personal digital assistants (PDA) with wireless capabilities, laptop computers enabled for wireless RF communications, etc., are now part of the culture of a substantial percentage of people in the United States. Different service providers are responsible for providing the infrastructure equipment and systems for supporting such wireless communications. While many, if not all, of the service providers provide wireless service for the largest cities and corresponding metropolitan areas, wireless coverage is still not ubiquitous. An area where communications is not supported may simply represent a location with too low a signal strength due to the user's handset going beyond the communication range of the cellular base station.

Wireless coverage becomes even less certain as a subscriber travels outside major metropolitan areas and away from major roadways, e.g. interstate highway system, in the United States. This is a result of the economics of providing wireless infrastructure systems. In more rural areas without a substantial concentration of subscribers or potential subscribers, it is economically unattractive to cellular service providers to build and maintain a sufficient number of cellular base stations to maintain substantially uninterrupted service areas. In an attempt to maximize possible coverage, most service providers have agreements with competing service providers to permit their customers to obtain service through the competing service provider network if it is viable in such rural areas. Such service provision is referred to as "inter-carrier roaming" and normally carries higher service fees than when the subscriber obtains service through the subscriber's primary network. Roaming requires the subscriber's handset to be compatible with the signaling format/protocol used by the roaming system, and this compatibility does not always exist. And even with the possibility of roaming, not all areas are served.

Many cellular service providers and Wi-Fi carriers provide information concerning service coverage areas. However, the specificity of this information is normally not sufficiently granular to allow subscribers or potential subscribers to accurately predict whether specific routes or roadways of importance to them, e.g. possible roads that could be traveled between an origination location and a destination, are adequately served by coverage. For example, a cellular service provider may list or show a rural town as being within the service area. From the cellular service provider's perspective, achieving a relatively high percentage of coverage, but less than 100%, of the rural town may constitute service coverage. However, it may not be clear based on information available from a wireless carrier if alternative roadways or sections along one of interest to the subscriber or potential subscriber are covered. Therefore, a need exists for wireless coverage information along a specified roadway and alternatives routes for travel.

SUMMARY

It is an object of the present invention to satisfy this need.

An illustrative method provides information to a user on wireless communication coverage along at least one route. A wireless availability server receives a user request for coverage information where the request includes an origination and destination location provided by the user for at least one route. A set of routes connecting the origination and destination locations is determined. A query is made to a database containing wireless coverage data based on the origination and destination locations, and the set of routes. A response to the query contains wireless coverage information along the set of routes. A reply is transmitted to the user responding to the user request where the reply contains the wireless coverage information.

In another embodiment of this invention, a wireless availability server provides this functionality.

DESCRIPTION OF THE DRAWINGS

Features of exemplary implementations of the invention will become apparent from the description, the claims, and the accompanying drawings in which:

DETAILED DESCRIPTION

As will be explained with regard to an illustrative system diagram, an exemplary method of the present invention provides wireless coverage information for specific geographic locations so that more accurate decisions can be made by a subscriber or potential subscriber based on the wireless service provider's coverage at specific locations of importance to the subscriber. A "wireless coverage for a specific geographic location" means that wireless communication coverage for the specific geographic location has been determined for that particular geographic location defined by one or several latitude and longitude coordinates, as opposed to merely being within an area in which wireless coverage is expected or projected to be available.

Figure 2:
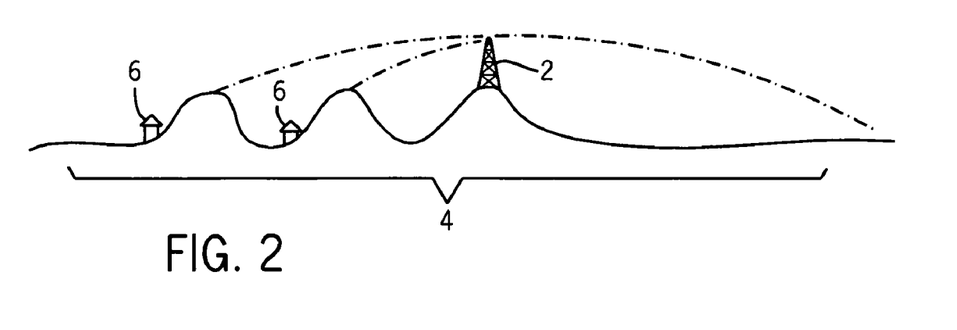
FIG. 2 illustrates a geographical topology in which wireless coverage is provided by a cellular base station.

FIG. 2 depicts a rural town located within a geographical area 4 in which a cellular base station antenna 2 is disposed on a hill near the center of the town. The topology of the town is such that the area to the right of the antenna is generally flat thereby providing line of sight or almost line of sight of propagation from the antenna to subscribers located in the region to the right of the antenna. To the left of the antenna, a series of hills exist such that line of sight signal propagation from the antenna 2 to homes 6 is disrupted. Assuming the hills that block the line of sight signal propagation between the antenna 2 and the homes 6 provide a substantial signal disruption, then the homes 6 will lie in what is referred to as a shadow area with respect to signal coverage. Subscribers living in these homes will likely experience poor or intermittent communications, if communication is possible at all. Assuming that the cellular carrier providing service to this town by antenna 2 achieves substantial communication coverage for a majority of the town, this town will likely be listed (or shown on a map) by the cellular carrier as being within its communication coverage. However, people living at or visiting homes 6 may experience a lack of communications. Therefore, a person planning a visit to a home 6 would expect to have cellular communications based on the carrier's information of the town as being within its coverage area. This may cause hardship where the visitor tells others that the visitor can be reached by cell phone while at home 6, when cell communications are not available to home 6.

Figure 1:
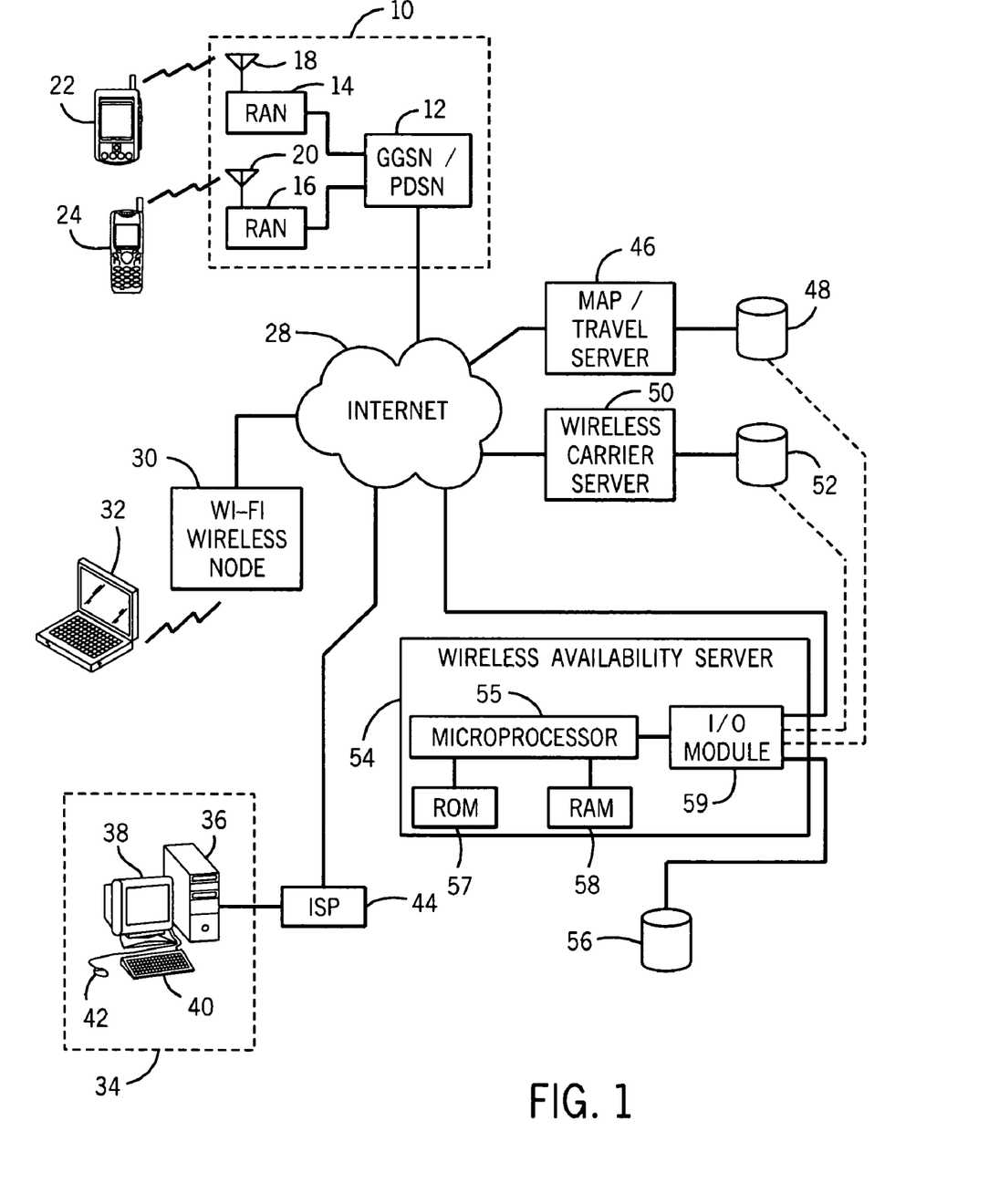
FIG. 1 is a block diagram of an illustrative communication system suited for incorporating an embodiment of the present invention.

Referring to FIG. 1, a wireless communication provider, e.g. cellular provider, network 10 includes a traffic handling node 12 which may consist of a gateway GPRS support node (GGSN) or a packet data serving note (PDSN) depending on the type of the network (GPRS or CDMA respectively). The traffic handling node 12 supports radio access nodes (RAN) 14 and 16 that are connected to antennae 18 and 20, respectively. Wireless handsets 22 and 24 have wireless communication links established with the antennae 18 and 20, respectively. The wireless handsets may comprise a traditional cellular telephone 24 with data capability, personal digital assistant (PDA) 22 with wireless communication capabilities, or other portable computing devices such as a laptop computer with wireless communication capabilities. Various technologies such as Bluetooth can be used to interface with such communication devices.

The traffic handling node 12 is coupled to the internet 28 to support communications between the handsets 22, 24 and others connected directly or indirectly to the internet 28. Although voice communications are possible using the internet, the communication of data (non-voice information) between the handsets and others connected to the internet are of primary interest for purposes of explanation of the embodiments of the present invention.

A wireless communication provider of wireless fidelity (Wi-Fi) service hot spots provides a plurality of access nodes, e.g. Wi-Fi wireless node 30, to facilitate communications between users with wireless devices such as a laptop computer 32 and others via the internet 28. Typically wireless communication protocols using IEEE 802.11 are employed to support wireless communications within a limited distance of the hot spot node, e.g. within a few hundred feet. Several of such nodes strategically placed at locations within a large building, e.g. an airport, shopping mall or hotel, can provide communications over most of the areas in or adjacent the building where users are likely to desire access. Similarly, a plurality of such nodes located around a small town or community can yield substantial, but not complete, coverage for the more popular areas of interest for users. As used herein, wireless communication includes, but is not limited to, cellular voice/data communications, Wi-Fi communications and other wireless RF communications where service coverage (signal propagation) for a particular geographic location may not be available even within an area where coverage is generally available.

A desktop computing apparatus 34 includes a desktop computer 36, an output display device such as monitor 38, and input devices such as keyboard 40 and a mouse 42. As will be known to those skilled in the art, the computer utilizes an operating system and a compatible application program, such as an Internet browser, to support Internet protocol communications such as using TCP/IP and HTTP. The desktop computer 36 is coupled to the Internet 28 via an Internet service provider (ISP) 44. Communications between the desktop computer 36 and the Internet 28 can be supported by various technologies, e.g. a dial up connection, DSL, cable modem, etc.

The Internet 28 supports communications with a variety of information providers. Maps and travel services are available to Internet users from a variety of providers. One such provider utilizes a URL host site that includes map/travel server 46 and an associated database 48 that stores a variety of map, highway and other geographic related information that can be retrieved in response to inquiries from users received by the server 46. Maps showing roadways and other geographic landmarks, as well as aerial views that can be scaled to show areas of interest can be accessed by users. Users typically select areas of interest by inputting a street address, city, state and/or ZIP code. Assuming a specific address in an urban setting is known by the user, such an input provides a reasonably specific geographic location as a target query. However, in a rural environment it becomes increasingly harder to identify a specific geographic location, e.g. a particular rest stop along a rural section of an interstate highway.

Most if not all wireless communication providers provide some information to subscribers by Internet access. For example, one such provider utilizes a URL host site that includes a wireless carrier server 50 and an associated database 52. This communication provider stores service coverage information in the database 52. This information may be provided in response to a query by user in the form of the map typically showing colored regions designated by the communication provider where coverage is provided. However, such information is generally limited in terms of the granularity made available to the user. For example, a circular areas or a series of intersecting circular areas may be shown in which it is to be assumed that coverage is provided throughout these areas. However, a specific geographic location even within such a designated circular area may have poor or no coverage due to any number of factors adversely impacting RF signal propagation between a handset at the specific geographic location and the cellular base station antenna designed to cover of that region. Alternatively, a wireless communication provider may elect to provide a map showing the location of its base stations and leave the areas of service coverage to the user's interpretation. In yet another method, the communication provider, especially for smaller communities or towns, may provide a list of cities or towns for which service is stated to be provided. None of these methods provided by communication carriers provide sufficient granularity (geographic specificity) to permit a user to determine with any certainty whether service is actually available at specific geographical locations, especially those in more rural locations.

In accordance with an illustrative embodiment of the present invention, a wireless availability server 54 with an associated database 56 is coupled to the Internet 28 and serves as a URL host that receives user queries requesting communication service coverage information at specific geographic locations as provided by one or more communication service providers. Based on information obtained from servers 46 and 50, as well as from information contained in its database 56, the wireless availability server 54 provides a response to the user's query as to communication service coverage at the specific geographic location(s) and/or along a travel route defined in the user's query. Details concerning functioning of the wireless availability server 54 are provided below. Depending upon the particular application and permission having been received from the proprietors of servers 46 and 50, wireless availability server 54 may obtain direct access to information contained in databases 48 and 52 as indicated by the dashed line paths, i.e. access to these databases other than by transmitting a query by the Internet to their respective servers. Some or all of the information contained in databases 48 and 52 could be stored or temporally cached in database 56 for faster access.

The wireless available the server 54 may utilize a microprocessor 55 coupled to read-only memory (ROM) 57, random access memory (RAM) 58, and an input/output communication module 59 that supports bidirectional data flow and communications with external devices. As will be appreciated by those skilled in the art, the server will use an operating system and application software that facilitates communications between the Internet 28 and the databases, as well as providing data processing and control to provide the functionality as explained herein. Although server 54 is shown as a separate server, it may be incorporated in a server that provides additional functionality, e.g. server 46 or server 50, and share internal architecture.

Figure 4:
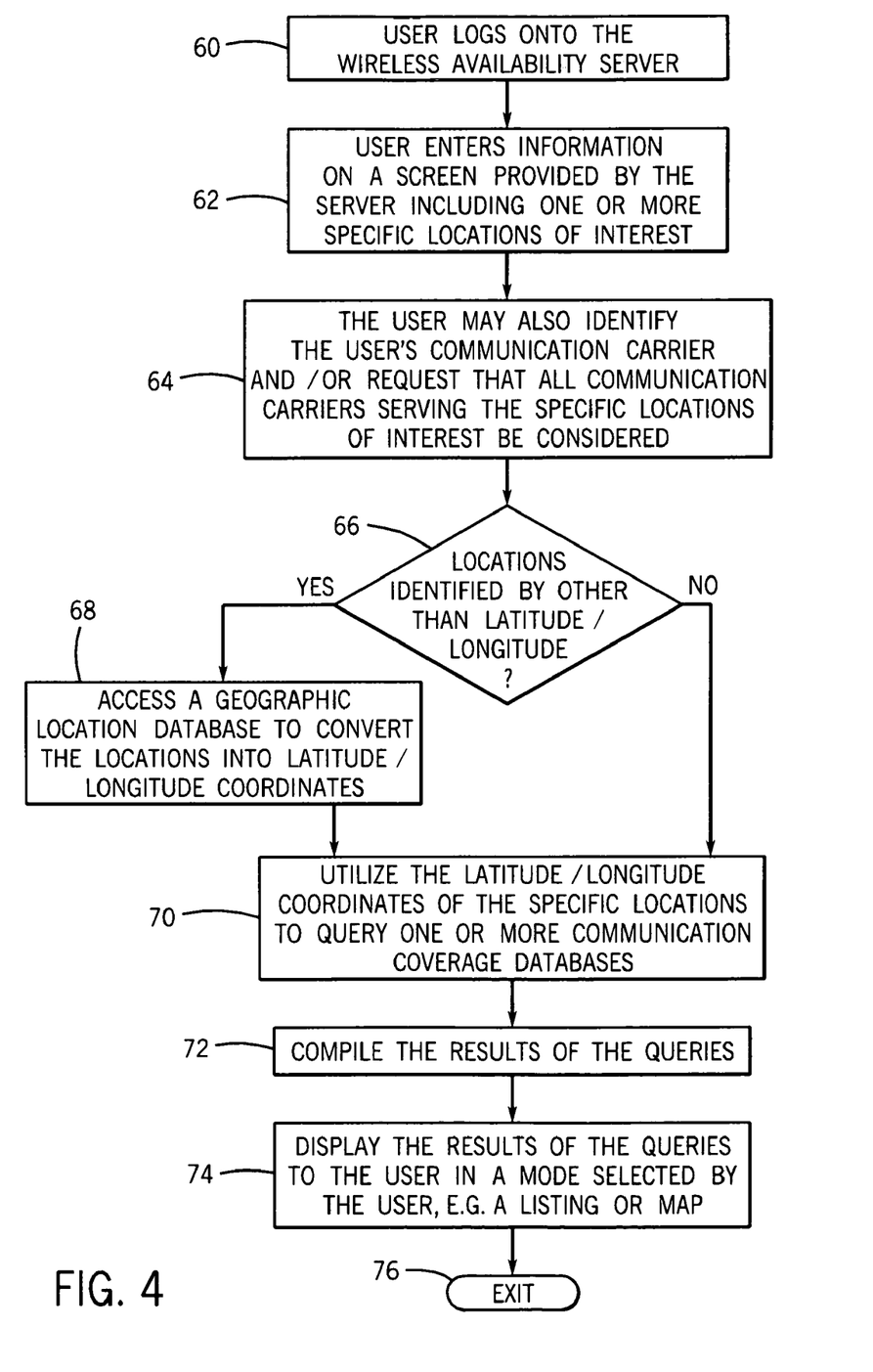
FIG. 4 is a flow diagram showing steps in accordance with an embodiment of the present invention.

FIG. 4 shows steps of an illustrated method in accordance with an embodiment of present invention in which users can obtain information about whether wireless coverage exists for a specific location. Although this method is explained with reference to FIG. 1, it will be apparent that other architectures and configurations of apparatus could be utilized to perform these steps. In accordance with step 60, a user logs onto wireless availability server 54. The user may communicate with the server over a wireline communication channel such as by desktop computing apparatus 34 or by a wireless communication channel that supports a wireless enabled laptop computer, PDA, data enabled cellular telephone, or other types of wireless handsets. Although the Internet 28 is shown as supporting communications with the wireless availability server 54, it will be apparent that other types of communication networks could be utilized to transport communications between the wireless availability server and users. In this example it will be assumed that the user employs the desktop computing apparatus 34 to communicate through the Internet 28 with the wireless availability server 54 which serves as a host for URL queries addressed to it.

In step 62 the user inputs information based on a request for geographic information from the server displayed on his screen. A request may include, for example, multiple input boxes for receiving alphanumeric characters entered by the user that identify specific locations, e.g. addresses or geographic coordinates. Alternatively, the request may comprise a map, which preferably can be scaled to obtain the desired degree of granularity, permitting the user to select specific locations of interest such as by clicking on the corresponding locations of the map. Or the request may include latitude and longitude information such as determined by a built-in GPS receiver to specify a current or previously stored location. In step 64 the user may also identify the user's communication carrier, a particular communication carrier of interest, or request that all communication carriers serving the specific locations of interest be considered.

In step 66 the wireless availability server determines whether the locations identified by the user are other than in a latitude/longitude format. The user may identify a specific location such as by entering alphanumeric characters such as by specifying a street address, city, state. The user may also specify locations using alphanumeric characters by specifying a particular mile marker or rest stop along an interstate highway in a designated state, or specifying a location relative to an intersection of roadways, e.g. 2 miles west of the intersection of Route 59 and Route 64 on Route 64 in Illinois. Alternatively, the user can identify a location by specifying its latitude and longitude such as determined by a global positioning satellite (GPS) receiver. The server will contain application software capable of parsing the locations input by the user and comparing these inputs against templates of formats to determine whether the inputs consist of location information contained in latitude and longitude coordinates. If a map was presented by the server to the user, locations selected by clicking on the map by the user will be returned to the server which can be translated into latitude and longitude coordinates.

A YES determination by step 66, indicating that the locations identified by the user are not in latitude/longitude coordinates, results in the wireless availability server accessing a geographic location database to convert the specified locations into latitude/longitude coordinates in step 68. The geographic location information may be stored in database 56 for quick access or may be obtained from database 48. If this information is to be obtained from a remote database, it may be obtained by the server 54 generating a query transmitted by the Internet to the server, e.g. map/travel server 46, hosting the remote database 48, or if permission has been granted and communication channels are available, the server 54 made directly access the database such as indicated by the dashed lines coupled to server 54 in FIG. 1.

A NO determination by step 66 or completion of step 68 results in continued processing in accordance with step 70. The latitude/longitude coordinates of the specific locations specified by the user are utilized to query one or more communication coverage databases. If available in database 56, this information can be most efficiently and directly retrieved by server 54. Alternatively, server 54 may generate a query transmitted by the Internet to the server, e.g. wireless carrier server 50 hosting database 52, to obtain coverage information concerning the specific location (s), or if permission has been granted and communication channels are available, the server 54 made directly access the database 52 such as indicated by the dashed lines coupled to server 54 in FIG. 1. Depending upon the granularity of information made available by the wireless carriers, it may be necessary to compile and store separate coverage information such as in database 56 for specific geographic locations identified by latitude/longitude coordinates. Such information can be compiled by empirical testing such as by determining signal strengths available at specific latitude and longitude coordinates for wireless carriers either by professional engineering signal strength studies or by obtaining such information from reports provided by users of the various wireless carriers indicating signal strength readings/communication quality at specific locations.

In step 72 the wireless availability server 54 compiles the results of the wireless coverage at the locations specified by the user. In step 74 the server transmits these results to the user in a mode that may be selected by the user. For example, the results may be presented in the form of a table in which each row indicates the location input by the user, the latitude/longitude coordinates of the location, and an indication of wireless coverage provided by each carrier represented as a separate column. Thus, the user can see for specified locations which carrier or carriers provide wireless coverage. Additionally, the indication of wireless coverage may provide indicia indicating the relative quality of service provided, e.g. a numerical ranking based on a predetermined scale, or a number of stars awarded depending on the quality of service provided by each carrier. Alternatively, the server may provide such information to the user in a map format in which each requested location is indicated by a color code having a predetermined scale, e.g. green representing above average signal strength, blue representing acceptable signal strength, red representing poor signal strength, and white representing out of coverage area. If information has been requested by the user for more than one carrier, numbers assigned to each carrier inserted into each displayed color code near each location on the map can be utilized to distinguish the service coverage provided by the respective carriers. This process terminates at Exit step 76.

Figure 3:
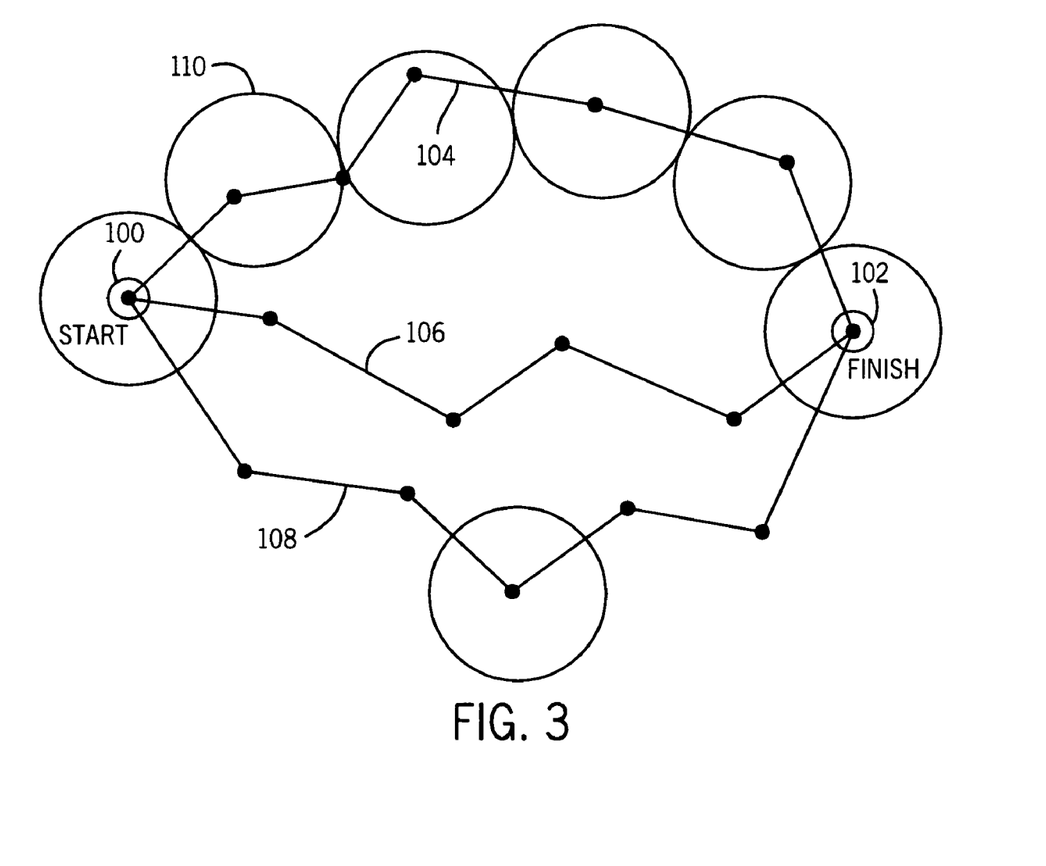
FIG. 3 is a representative diagram of three different driving routes between a starting point and a finish point with cellular coverage areas shown for each of the routes.

FIG. 3 represents three different driving routes between a starting (origination) point 100 and a finished (destination) point 102. In this embodiment a user desires to know what, if any, wireless coverage will be available to the user as the user drives from origination 100 to destination 102. The user may desire to obtain this information prior to beginning the journey so that the wireless coverage information can be factored into a decision as to which route to choose. Even if only a single route is feasible for the journey, the user may still desireto know what wireless coverage will be available along the way in order to advise others of projected times when communications will be available. Routes 104, 106 and 108 are shown in which the dots represent towns, geographic features or road intersections with the segments between dots representing a section of road. Each of the circles 110 represents an area of wireless coverage such as provided by a single cellular base station. In this illustrative example, wireless coverage is shown by circles 110 for the user's carrier. For route 104, wireless coverage is provided for the entire route. For route 106, no wireless coverage is provided except in the vicinity of the origination and destination. For route 108, wireless coverage is provided in the vicinity of the origination, destination and one intermediate location along the route; a substantial portion of the route having no coverage.

Knowing what, if any, wireless coverage is available along alternative routes may influence the route selected by the user for the journey. If always having the availability of wireless communications is important, the user may elect to select route 104 even if this route will make the journey longer than selecting an alternative route. If the journey is of a length to require an overnight stay at an intermediate location along the route, route 108 may be selected by a user where it is sufficient to have wireless communications during the overnight stay even though communications by not be available for substantial parts of the journey during the first and second day of travel. Assuming that route 106 will provide the fastest journey, a user may be willing to select this route even though wireless coverage is not provided except that the origination and destination. Even if route 106 is selected, it will be important to the user to know that wireless communications will not be available so that the user can inform interested parties that communications with the user will not be available during the journey. For purposes of route selection, it may be sufficient to know general areas of projected communication coverage as opposed to determining coverage at particular coordinates.

Figure 5:
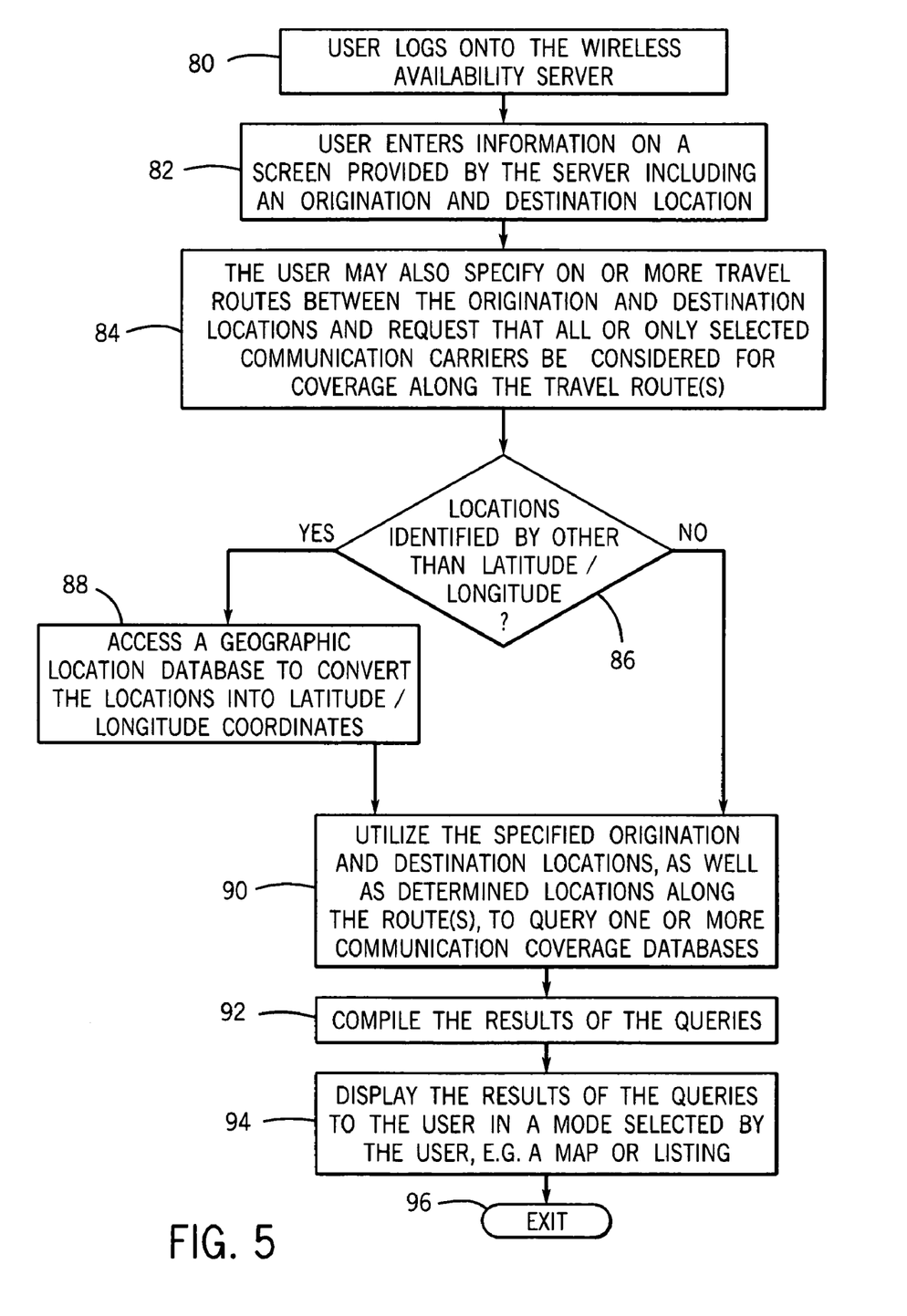
FIG. 5 is a flow diagram showing steps in accordance with another embodiment of the present invention.

FIG. 5 shows steps in an illustrative method in accordance with an embodiment of present invention such as utilized to provide information as explained with regard to FIG. 3. In step 80 user logs onto the wireless availability server utilizing either a wireline or wireless communication channel. In step 82 the user enters information based on a request from the server as displayed on his screen. As explained with regard to step 62, the user may enter alphanumeric information or identify an origination and destination location by clicking on a map showing appropriate roadways as provided by the server. Alternatively, a mobile user may transmit a current location, e.g. based on GPS information, to identify a point of origination, or the current location of the mobile user can be determined independently by the supporting wireless network. In step 84 the user may specify one or a plurality of travel routes between the origination and destination locations such as by designating intermediate locations along specified routes or by tracing each route between the origination and destination with a mouse to identify the different routes of interest or the system may automatically select a variety of routes based on the origination and destination points. The user may further specify whether wireless coverage areas are to be shown only for his primary wireless carrier or for additional carriers is well.

A determination is made in step 86 of whether the locations identifying the routes are specified by other than latitude/longitude coordinates. For example, the user may have identified the origination, destination and intermediate points along each route by entering the names of corresponding cities or intersections of major roadways to be traveled. Alternatively, the user may identify locations by providing its latitude and longitude. The server will contain application software capable of parsing the locations input by the user in comparing these inputs against templates of formats determining whether the inputs consist of information contained in latitude and longitude coordinates. If a map was presented by the server to the user for input purposes, the location selected by clicking or tracing a map by the user will be returned to the server which will translate the selected locations into latitude and longitude coordinates.

A YES determination by step 86, indicating that the locations identified by the user are not in latitude/longitude coordinates, results in the wireless availability server accessing a geographic location database to convert the specified locations into latitude/longitude coordinates. This information may be obtained from various databases as explained in regard to step 66.

A NO determination by step 86 or the completion of step 88 results in continued processing in accordance with step 90. The latitude/longitude coordinates of the specified origination and destination locations as well as determined locations along the route(s) are utilized to query one or more communication coverage databases to determine wireless coverage provided along the route(s). This information may be obtained in a similar matter as explained with regard to step 70. However, if only projected areas of communication coverage are acceptable for purposes of route selection, a conversion into latitude/longitude coordinates need not be performed if the database and/or interface to the coverage data can accept queries in other formats. In step 92 the wireless availability server 54 compiles the results of the wireless coverage at the locations/route specified by the user. In step 94 the server transmits the compiled results to the user such as in a mode that may be selected by the user. Although the results can be displayed in various formats as explained with regard to step 74, it may be especially useful for display the results to the user in a visual or map format such as represented by FIG. 3. This process terminates at Exit 96.

Alternatively, the wireless availability server can generate route possibilities based on the point of origination and destination being defined by the user. That is, various routes can be automatically computed along with wireless coverage along these routes. For example, the shortest or most direct route can be determined, and then alternative routes on either side of the shortest route can be determined. After all of the potential routes are determined, wireless coverage along the entirety of each can be determined and conveyed to the user such as on a map that highlights the routes and shows wireless coverage relative to the routes. Of course, criteria input or selected by the user can form the basis for controlling these determinations, e.g. the user may direct that only routes where wireless coverage is available at least every specified time interval (every 2 hours) be shown to restrict the amount of time the user would be without wireless coverage during the journey. Or the user can specify that only routes with complete coverage are to be chosen, even if that involves large detours. The latter is useful for people participating in a conference call or a conversation where interruptions must be minimized or not avoided.

Although exemplary implementations of the invention have been depicted and described in detail herein, it will be apparent to those skilled in the art that various modifications, additions, substitutions, and the like can be made without departing from the spirit of the invention.

The scope of the invention is defined in the following claims.

We claim:

1. A method for providing information to a user on wireless communication coverage along at least one route comprising the steps of:
   receiving at a wireless availability server a user request for said information where the request includes an origination and destination location provided by the user for the at least one route;
   determining a set of routes connecting the origination and destination locations;
   querying a database containing wireless coverage data based on the origination and destination locations, and the set of routes;
   receiving a response to the query where the response contains wireless coverage information along the set of routes;
   transmitting a reply to the user responding to the user request where the reply contains the wireless coverage information.

2. The method of claim 1 wherein the step of receiving a user request comprises the step of receiving as part of the user request identification of at least one wireless carrier for which wireless coverage for specific geographic locations along the routes is sought, where wireless coverage means the ability to provide wireless communications for a user's portable wireless device at the specific geographic locations along the routes.

3. The method of claim 2 wherein the user request includes the step of receiving identification of a plurality of wireless carriers for which wireless coverage for specific geographic locations along the routes is sought.

4. The method of claim 1 further comprising:
   determining if the origination and destination locations are in the form of latitude and longitude coordinates;
   upon the determination that said origination and destination location are not in the form of latitude and longitude coordinates, converting the origination and destination locations into corresponding latitude and longitude coordinates;
   wherein the step of receiving the response to the query comprises receiving a response that is uniquely determined for the particular latitude and longitude coordinates.

5. The method of claim 1 wherein the step of determining the set of routes connecting the origination and destination locations comprises determining intermediate sections of roads that interconnect to from a complete continuous path between the origination and destination locations.

6. The method of claim 1 further comprising the steps of:
   determining a plurality of sets of routes connecting the origination and destination locations where each of the plurality defines a different complete route connecting the origination and destination locations;
   determining for each different complete route intermediate sections of roads that interconnect to from a continuous path between the origination and destination locations.

7. The method of claim 1 wherein the user request comprises a query requesting that the wireless availability server independently determine the current location of the user, and use the current location as the origination location.

8. The method of claim 1 wherein the user request includes a list containing at least one specific geographic location communicated in the form of alphanumeric characters.

9. The method of claim 1 wherein the user request includes indicia that identifies origination and destination locations relative to a map displayed to the user by the wireless availability server.

10. The method of claim 1 wherein the reply transmitted to the user comprises a map containing indicia located along the set of routes, where the indicia indicates wireless coverage information relative to the set of routes.

11. A server adapted to provide information to a user on wireless communication coverage along at least one route comprising:
    means for receiving a user request for said information where the request includes an origination and destination location provided by the user for the at least one route;
    means for determining a set of routes connecting the origination and destination locations;
    means for querying a database containing wireless coverage data based on the origination and destination locations, and the set of routes;
    means for receiving a response to the query where the response contains wireless coverage information along the set of routes;
    means for transmitting a reply to the user responding to the user request where the reply contains the wireless coverage information.

12. The server of claim 11 wherein the means for receiving a user request receives as part of the user request identification of at least one wireless carrier for which wireless coverage for specific geographic locations along the routes is sought, where wireless coverage means the ability to provide wireless communications for a user's portable wireless device at the specific geographic locations along the routes.

13. The server of claim 12 wherein the user request includes identification of a plurality of wireless carriers for which wireless coverage for specific geographic locations along the routes is sought.

14. The server of claim 11 further comprising:
    means for determining if the origination and destination locations are in the form of latitude and longitude coordinates;
    means for converting the origination and destination locations into corresponding latitude and longitude coordinates upon the determination that said origination and destination location are not in the form of latitude and longitude coordinates;
    wherein the means for receiving the response to the query comprises means for receiving a response that is uniquely determined for the particular latitude and longitude coordinates.

15. The server of claim 11 wherein the means for determining the set of routes connecting the origination and destination locations determines intermediate sections of roads that interconnect to from a complete continuous path between the origination and destination locations.

16. The server of claim 11 further comprising:
means for determining a plurality of sets of routes connecting the origination and destination locations where each of the plurality defines a different complete route connecting the origination and destination locations;
means for determining for each different complete route intermediate sections of roads that interconnect to from a continuous path between the origination and destination locations.

17. The server of claim 11 further comprising means for receiving the user request by Internet access between computing apparatus utilized by the user to access the Internet and the wireless availability server which functions as a web host coupled to the Internet.

18. The server of claim 11 wherein the user request includes a list containing at least one specific geographic location communicated in the form of alphanumeric characters.

19. The server of claim 11 wherein the user request includes indicia that identifies origination and destination locations relative to a map displayed to the user.

20. The server of claim 11 wherein the reply transmitted to the user comprises a map containing indicia located along the set of routes, where the indicia indicates wireless coverage information relative to the set of routes.

* * * * *

UNITED STATES PATENT AND TRADEMARK OFFICE
CERTIFICATE OF CORRECTION

| | |
|---|---|
| PATENT NO. | : 7,609,678 B2 |
| APPLICATION NO. | : 11/374365 |
| DATED | : October 27, 2009 |
| INVENTOR(S) | : Sharma et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 629 days.

Signed and Sealed this

Twelfth Day of October, 2010

David J. Kappos
*Director of the United States Patent and Trademark Office*